March 15, 1927.

E. E. CRONENWETH 1,621,398

ANTISKID CHAIN

Filed June 27, 1924

E. R. Ruppert.
WITNESS:

E. E. Cronenweth INVENTOR
BY Victor J. Evans
ATTORNEY

Patented Mar. 15, 1927.

UNITED STATES PATENT OFFICE.

EARL E. CRONENWETH, OF WILKINSBURG, PENNSYLVANIA.

ANTISKID CHAIN.

Application filed June 27, 1924. Serial No. 722,781.

In the application of an anti-skid chain to the tire of an automobile, the tendency of the chain is to shorten, due to the fact that the cross chain ends lose their natural position and swing back on the links of the side chains to which they are connected, with the result that a wedging as well as a clamping action takes place between the end links of the cross chain and the last mentioned links of the longitudinal chains. When these chains become so fastened together, it is a tedious job in straightening the same, that is, in again bringing the cross and the longitudinal or side chain links in proper position for ready application on the tire of the wheel.

It is therefore to be considered the object of this invention to produce a simple means for preventing such wedging or locking engagement between the end links of the cross chains and the link of the side chain to which the link of the cross chain is connected.

To the attainment of the foregoing object, reference is to be had to the drawing which accompanies and which forms part of this application.

In the drawing:—

Figure 1:
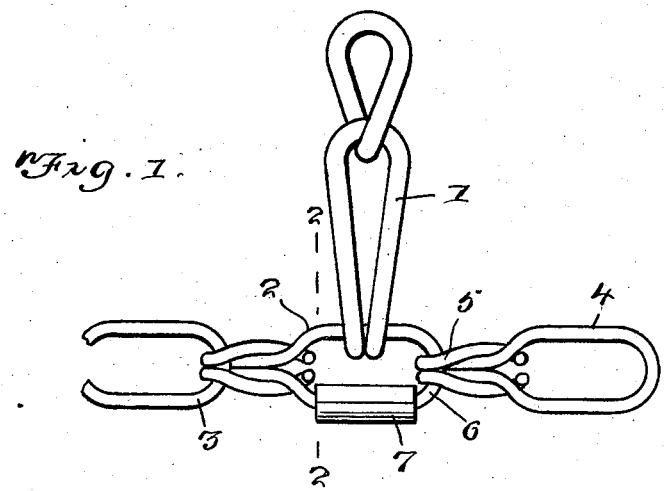
Figure 1 is a fragmentary plan view of an anti-skid chain showing the link of one of the side chains to which the end link of one of the cross chains is attached provided with of a means for preventing a biting or wedging action between the said link of the cross chain and the link connected with the first mentioned link of the side chain.
Figure 2:
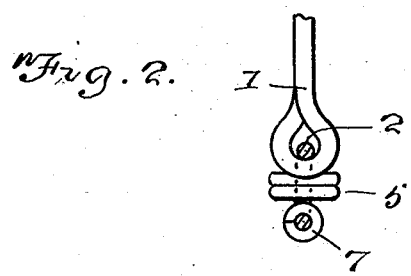
Figure 2 is a sectional view on the line 2—2 of Figure 1.

A portion of a side chain and a portion of a cross chain of an anti-skid chain for automobiles has been illustrated by the drawing. The end link of the cross chain is indicated by the numeral 1, and the link of the side chain to which the same is connected is indicated by the numeral 2. The link 2 has one of its ends formed with the usual eye to engage the adjacent link 3 of the side chain, while a link 4 is likewise provided with an eye 5 to engage the rounded end of the link 2. This construction is common in anti-skid chains.

Figure 3:
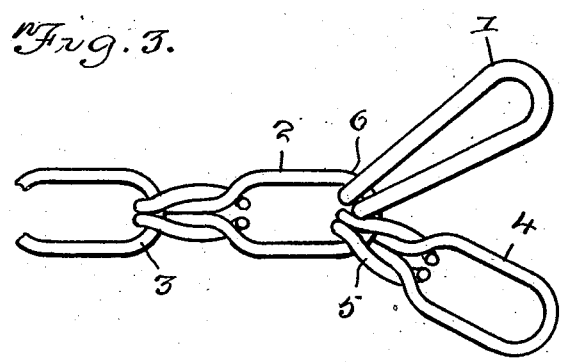
Figure 3 is a fragmentary plan view to illustrate the manner in which the end links of the cross chains effect a wedging and binding action upon the links of the side chains.

It is necessary that the cross chains be arranged directly at right angles to the side chains when the anti-skid chain is to be applied to the tire. In removing an anti-skid chain from a tire, the same is handled rather recklessly and is frequently thrown in a heap under a seat in the automobile. The result is that the end links 1 of the cross chains ride over the rounded end 6 of the link 2, to which they are connected to force the link 4 at an outward angle with respect to the link 2 and likewise to effect both a wedging and binding engagement between the respective links 1 and 2 and the eyes 5 of the link 4. When the links are thus bunched together it is frequently necessary to employ a wedge, hammer or the like to disengage the same. With my improvement, however, such bunching and wedging of the links is entirely overcome. On the outer arm of the link 2 I secure or form a longitudinal enlargement indicated by the numeral 7. The enlargement 7 is in the nature of a split sleeve and is of a length approximately equalling that of the side of the link on which it is arranged. The sleeve is open when arranged on the link and is closed and compressed against the link by the simple employment of a pair of pincers or the like. The enlargement prevents the eye 5 of the link 4 traveling a determined distance over the rounded end 6 of the link 2 so that the eye end of the cross link 1 cannot be brought to the position illustrated in Figure 3 of the drawing and consequently cannot exert any binding action against the eye 5, the rounded end 6 of the link 2 and the eye end of the link 1.

Having described the invention, I claim:—

In combination with an anti-skid chain, extending side chains and cross chains whose end links are connected to certain of the links of the side chains, of a split metal sleeve arranged on and secured to that arm of the link opposite the arm to which the end link of the cross chain is connected, and said sleeve being of a length approximately equal to that of the arm of the link to which it is secured.

In testimony whereof I affix my signature.

EARL E. CRONENWETH.